2 Sheets—Sheet 1.

J. HAINES.

Harvester.

No. 545.

Reissued April 13, 1858.

N. PETERS, Photo-Lithographer, Washington, D. C.

2 Sheets—Sheet 2.

J. HAINES.

Harvester.

No. 545.

Reissued April 13, 1858.

N. PETERS. Photo-Lithographer, Washington, D. C.

UNITED STATES PATENT OFFICE.

JONATHAN HAINES, OF PEKIN, ILLINOIS.

IMPROVEMENT IN GRASS-HARVESTERS.

Specification forming part of Letters Patent No. 13,523, dated September 4, 1858; Reissue No. 545, dated April 13, 1858.

*To all whom it may concern:*

Be it known that I, JONATHAN HAINES, of Pekin, in the county of Tazwell and State of Illinois, have invented certain new and useful Improvements in Grass-Harvesters; and I do hereby declare the following to be a full, clear, and exact description of the construction and operation of the same, reference being had to the accompanying drawings, making a part of this specification, in which—

Figure 1:
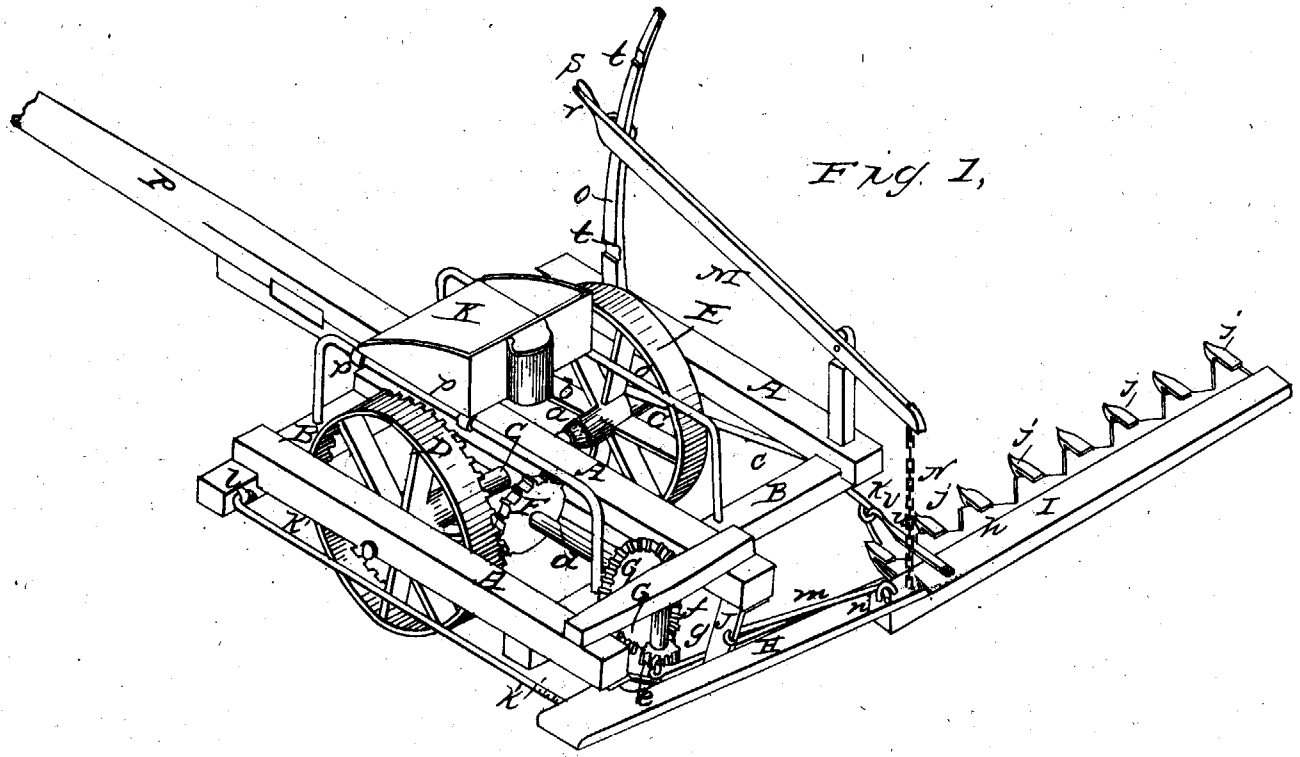
Figure 2:
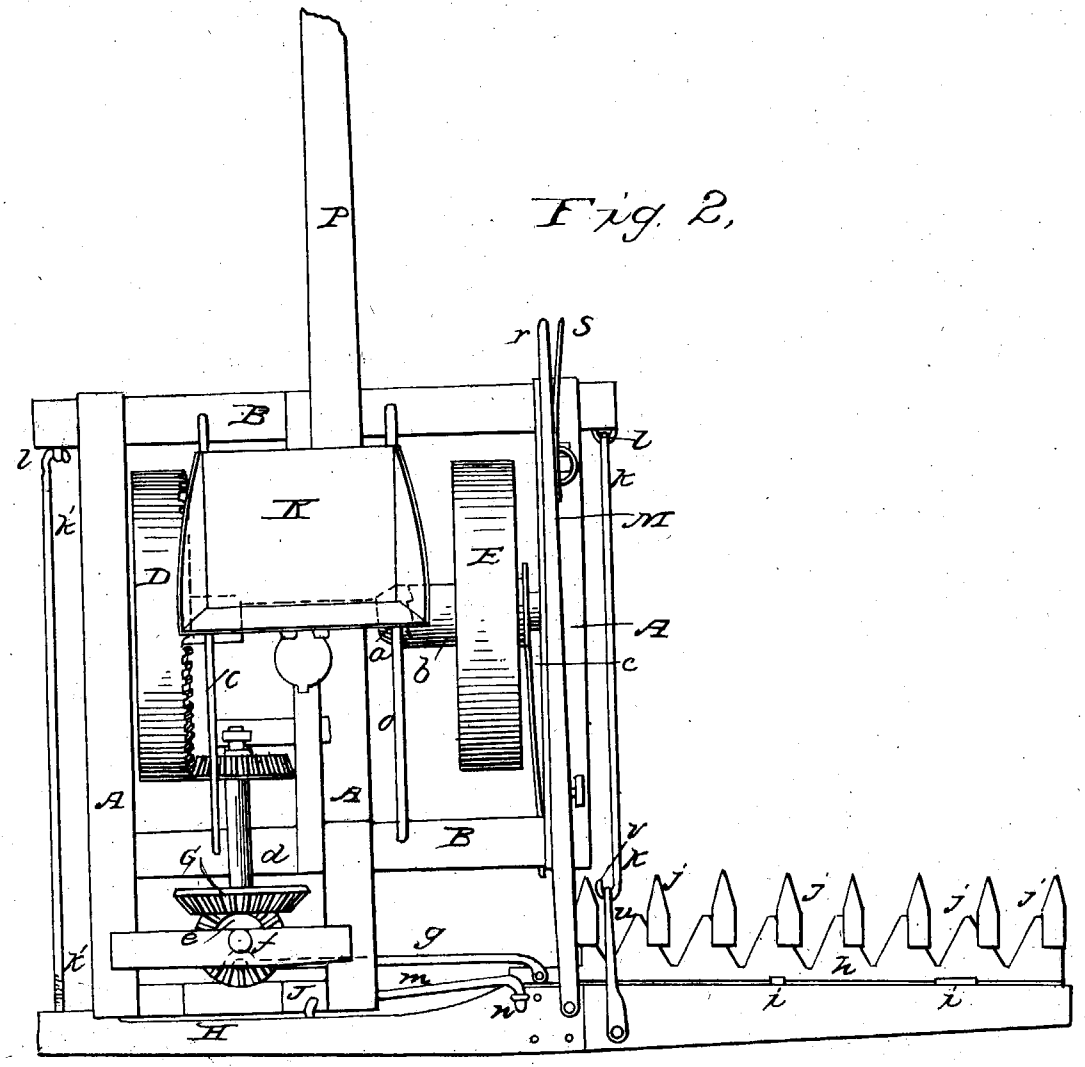

Figure 1 represents a perspective view of the machine in question, and Fig. 2 represents a top plan thereof.

Similar letters of reference, where they occur in the separate figures, denote like parts of the machine in both of them.

Cutter-bars have heretofore been hinged to the frame of a harvesting-machine, but so hinged that the heel of said bar could not be raised without raising also the point or other end thereof. The objection to such a hinged bar is obvious—viz., that if any portion of the bar rises to pass over an obstruction it will to a greater or less extent raise up other portions with it that are not likely to be obstructed, and thus the machine passes unnecessarily over ground that is not mown by it.

Now, the nature of my invention consists in a loose cutter-bar or finger-beam so hung to the frame of the machine as that either end may be raised or lowered while the opposite end continues to rest upon the ground; and my invention consists also in the manner in which I connect the cutter-bar or finger-beam to the main frame.

To enable others skilled in the art to make and use my invention, I will proceed to describe the same with reference to the drawings.

A suitable main frame may be composed of the longitudinal pieces A and transverse pieces B, which frame is supported on the journals of an axle, C, that carries the two wheels D E, one of which wheels, D, is fast on said axle, so that they shall turn together, and the other one, E, is fast and loose, as circumstances may require, as follows:

*a* is one part or half of a clutch, which is fast on the axle C, the other part or half, *b*, of said clutch being formed on the inner part of the hub of the wheel E.

*c* is a spring bearing against the outer side of the hub, on which one-half of the clutch is formed, and holds it into gear with the fixed half *a*, the projections or teeth of the two parts forming the clutch being so made that when the machine is drawn forward both wheels revolve with the axle and both become driving as well as supporting wheels; but when the machine is being turned around, the turning being almost invariably toward the cutters, the wheel E becomes loose from the clutch, the inclined sides of the projections, which form the clutch, slipping past each other, and then said wheel E turns on and independent of said axle C, and thus facilitates the turning around of the machine. Both wheels D E are therefore driving-wheels when the machine is cutting grain or grass, and besides the weight of the machine itself the weight of the driver is divided on the two wheels, and I thus avail myself of all the weight to throw friction on the driving-wheels to prevent them from slipping.

The wheel D is provided with cogs on the inner edge of its perimeter, which gear with the cogs of a pinion, F, on one end of the shaft *d*, and on the other end of this shaft *d* there is a bevel-cog wheel, G, that works into a pinion, *e*, on the vertical shaft *f*, and to a crank on the lower end of this shaft *f* is fastened one end of the rod *g*, the other end of said rod being connected to the cutters or to the cutter-beam to give the cutters their necessary vibratory motion. The heel *h* of the cutters or their bar or stock works under guides *i i*, Fig. 2, and the cutters are protected by fingers *j* in the usual manner and for the usual purpose.

The finger bar or beam is composed of two pieces, H I, united together by bolts passing through the lap of their adjoining ends, the parts H sustaining the draft of the cutters and bar and the part I, carrying the cutters, fingers, or guards, &c., drags along on the ground. The object in making the cutter or finger bar in two pieces is that if one should get broken or wear out it could be replaced without removing the other part. The two parts H I should be lapped or united, as shown in the drawings. The cutter-bar is hung loosely to the main frame by two rods, *kk'*, both of which rods, at their front ends, are hooked or looped into "dead-eyes" on the front transverse piece, B, of the main frame, the object of the loop and dead-eye fastening being that said rods may freely move up and down without restraint. The rear ends of these rods are differently connected to the cutter or finger bar or beam H I. The one, *k*, is attached to said bar or beam or to a bow or loop, *u*, attached to the beam by a joint, as at *v*, so that while said rod *k* may fully sustain the drag of the cutter bar or beam it will not in any manner check or cramp the free play of said bar or beam as it rises or falls to adapt itself to the inequalities of the ground or to pass over any intervening obstacle. The other rod, *k'*, (though hinged with a fastening at its front end, that is in effect like a universal joint, as dead-eye or loop fastenings are generally,) has its rear end passed through the cutter or finger bar and held thereto by a screw or nut, so as to make that connection rigid to a very great degree. By thus hanging the cutter-bar it is free to rise and fall to every projection or depression on the surface of the ground, and, being loosely hung, can raise or lower at either one of its ends without raising or lowering its other end from the ground. This feature in grass-machines is particularly essential, as it does not leave so much ground unmown as when the cutter or finger bar is simply hinged to the main frame at its heel, as heretofore done, and which, when raised at the heel, must also raise the point or other end, while by my construction the bar or beam can rock or roll upon the ground in the line of its length, and thus mount and pass over inequalities on the surface without raising the whole bar to do so. My cutter or finger bar or beam is a loose one, which adjusts itself vertically at either end without throwing out the other end, uncontrolled in this particular by the main frame, but perfectly guided in its forward movement or path by its connection to said frame, or, in other words, while the said bar or beam is free to rise or fall at either of its ends without communicating a similar movement to its other end, yet laterally it is as rigid and as readily controlled by the main frame as though it were a fixed immovable part thereof. So, also, may the wheels of the main frame rise and fall to the inequalities of the ground without communicating that motion to the cutter bar or beam, for said beam adapts itself to the surface which it passes over without being influenced injuriously by the motion of the main frame; but at the same time the main frame directs and guides said bar or beam in its forward motion, but not its vertical movements, the latter being governed by the ground over which it is passing and varying with the undulations of that ground.

While the two rods *k k'* sustain the drag of the bar or beam in its onward progress, they do not sustain the lateral tendency of said beam, though they may do so in part, and to prevent this lateral movement I use another bar, *m*, which is attached to a piece, J, rigidly connected to the main frame by one of its ends and to the cutter-bar at *n* by its other end. The connections of this rod *n* are by loops and dead-eyes also, which make the cheapest universal joint or hinge, and as practically effect the desired end as other and much more expensive hinged or jointed connections. The rod or bar *k* might be more properly called a "drag-bar" and not a "brace," though at times it may be either; but the rod or bar *k'* is rather a brace than a drag-bar, and as a brace might be rigid to a very great extent. The other rod, *m*, holds and braces just as the tendency of the bar or beam on which the cutters or fingers are attached may for the time being be. The object of these several parts being thus distinctly set forth, it will be obvious that their equivalents may be substituted for them; but so long as the object is attained by any of the ordinary well-known mechanical appliances I should deem them as involving the general objects of my invention—viz., the application of the loose finger or cutter bar to harvesters.

K is the driver's seat. It is connected to the supports or rails *o o*, which extend from front to rear of the frame by loops *p p*, so that the driver may, without rising from his seat, and by simply using his feet, move said seat forward or back, so that his weight may be used to balance the machine and throw the cutters into or out of the grass, as may be required.

To a standard, L, on the right-hand longitudinal piece A, is hung a lever, M, to the rear end of which is hung by a chain or link, N, the cutter-bar H I at about its center.

Near the front end of the lever M, which is provided with a handle, *r*, and a spring-catch, *s*, is an upright piece, O, supported by the frame of the machine, and provided with any suitable number of notches, *t*, into which the spring-catch *s* will drop when it is released from the hand of the driver. By means of this lever M the driver can raise or hold up the cutter bar and cutters when it is desirable to raise them for any purpose. P is a tongue centrally placed on the frame or between the wheels, so as to place the horses as near the center of the line of draft as possible without being too near to the standing grass.

A seat for a driver which was susceptible of adjustment has been used; but this seat, when adjusted, was permanent, and consequently the driver could not move himself forward and back, as the exigencies of the case might require—as, for instance, when working on ascending or descending ground, or in light or heavy grass, all of which may occur within a few rods, and if the machine were stopped to make the necessary adjustments of it for all these contingencies it would be doing but little else than undergoing adjustment. By my mode of arranging the seat the driver may aid the machine by shifting his seat and weight at any time, or as occasion may require.

The substitution of iron for wood, or vice versa, being so common and well known, I claim of course the privilege of using in the construction of my machine either material that I may prefer.

Having thus fully described the nature and object of my invention, what I claim therein as new, and desire to secure by Letters Patent, is—

1. In combination with a main frame, a loose cutter-bar or finger-beam that projects laterally from it, and so hung to the frame of the machine as that in being dragged over the ground it shall receive all its vertical movements solely from the undulations of the ground over which it is drawn, by means substantially as described.

2. The bars or rods *k k'* for connecting the beam to the main frame, when said bars effect the object herein stated, and by the means substantially as described.

3. The combination of two hinged or jointed rods or bars, *k m*, for allowing the cutter or finger bar or beam its vertical but restraining its lateral motion, substantially as described.

JONATHAN HAINES.

Witnesses:

M. TACKABERRY,

A. MACK.